(No Model.)
J. R. GOEHRING.
CHECK VALVE.
No. 459,576.  Patented Sept. 15, 1891.
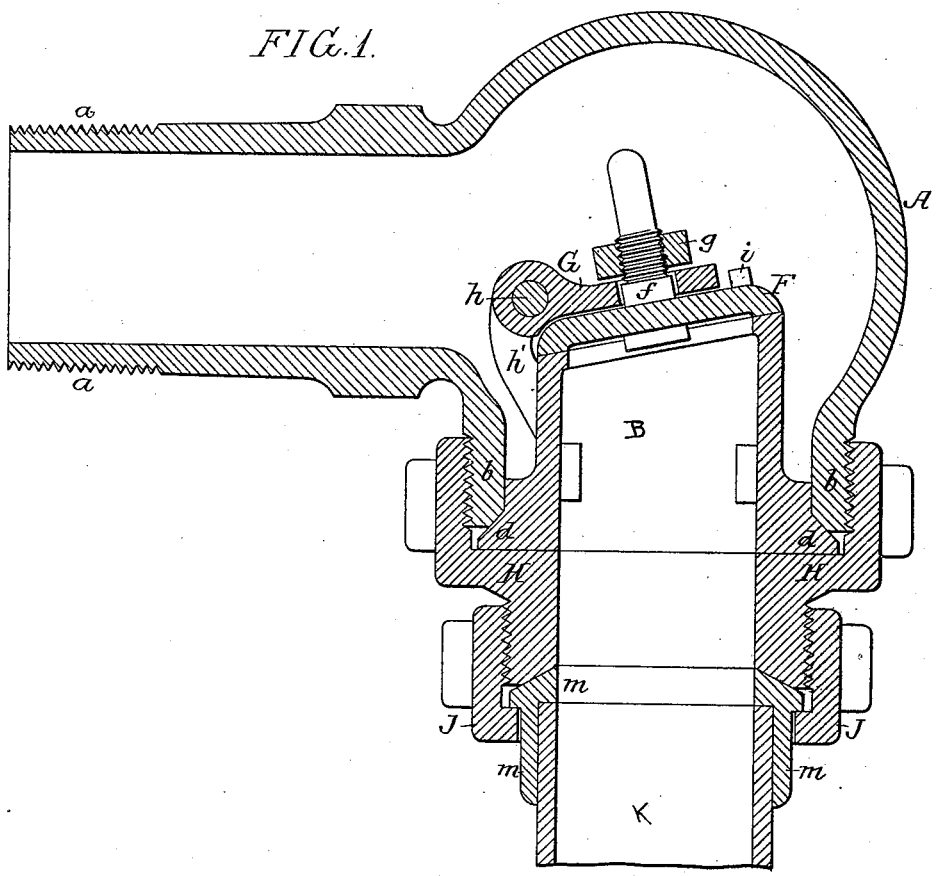
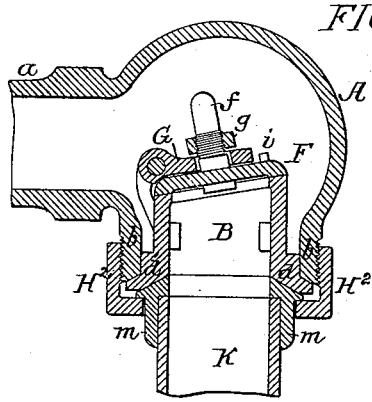
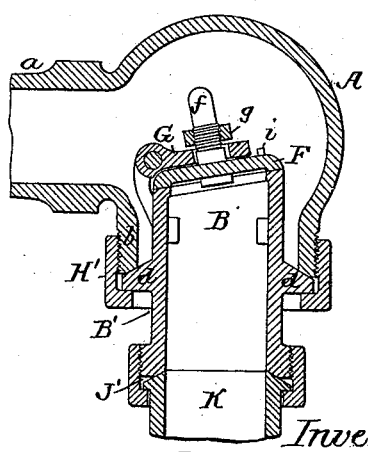
Witnesses:
R. Schlucher.
A. V. Groupe.
Inventor:
John R. Goehring
by his Attorneys
Howson & Howson

UNITED STATES PATENT OFFICE.

JOHN R. GOEHRING, OF PHILADELPHIA, PENNSYLVANIA, ASSIGNOR TO HENRY BELFIELD AND T. BROOM BELFIELD, OF SAME PLACE.

CHECK-VALVE.

SPECIFICATION forming part of Letters Patent No. 459,576, dated September 15, 1891.

Application filed October 6, 1890. Serial No. 367,151. (No model.)

*To all whom it may concern:*

Be it known that I, JOHN R. GOEHRING, a citizen of the United States, and a resident of Philadelphia, Pennsylvania, have invented certain Improvements in Check-Valves, of which the following is a specification.

My invention consists of a check-valve especially intended for use on locomotive-engines, one object of my invention being to so construct said check-valve that it can be used with equal facility either in a horizontal or vertical position or on either the right or left hand side of the boiler, a further object being to prevent rapid wear of the valve-disk, and a still further object being to provide for the ready detaching of the pipe connection from the valve-chest without disturbing any other part of the valve. These objects I attain in the manner hereinafter set forth, reference being had to the accompanying drawings, in which—

Figure 1 is a longitudinal section of a check-valve constructed in accordance with my invention, and Figs. 2 and 3 are views illustrating modifications of certain features of the invention.

A represents the casing of the valve, which has at one side a threaded stem or extension $a$ to be screwed into the shell of the boiler, the casing also having a threaded branch $b$, with a beveled end forming a ground seat for the beveled flange $d$ on a sleeve B, which projects into the casing A and forms the seat for the valve-disk F, this seat being preferably inclined slightly toward the discharge branch or neck $a$ of the valve-casing, as shown. The valve-disk F has a stem $f$, which fits loosely in an opening in an arm G, hung by means of a pin $h$ to lugs or ears $h'$, projecting from the sleeve B, a portion of this stem $f$ being threaded for the reception of a nut $g$, which, however, is not screwed down so tightly as to confine the valve-disk F rigidly to the arm G, a certain amount of play being permitted in order that the valve-disk may be free to adapt itself to the seat. The stem $f$ projects some distance beyond the nut $g$, whereby the contact of the end of this projecting portion of the stem with the shell or casing A of the valve will serve to limit the extent of opening movement of the valve-disk. On the back of the valve-disk F is a lug or projection $i$, which by contact with the arm G will arrest any rotation of the valve-disk on its axis, and thus prevent the spinning motion of the valve-disk, which is in many cases an annoyance and source of wear. The outer portion of the sleeve B is acted upon by a spanner-nut H, screwed onto the threaded branch $b$ of the valve-casing, so as to confine said sleeve rigidly to its seat, and the outer portion of said nut is also threaded externally for the reception of a second spanner-nut J, which bears upon a flange or collar $m$, secured to the end of the pipe K, through which the fluid flows, this flange or collar having a beveled end adapted to a ground seat formed in the outer end of the nut H.

It will be evident that the check-valve described can be used with equal facility whether the neck or branch $a$ projects on the right-hand side or on the left-hand side of the casing, and as the sleeve B can be rotated in respect to the casing of the valve when desired said valve can also be employed in a vertical position—that is to say, with the neck $a$ projecting either upward or downward from the main casing—and yet the valve-disk will in either case swing upwardly in opening and downwardly in closing, as is preferable in a check-valve arranged vertically.

By coupling the supply-pipe K to the nut which confines the sleeve B, I am enabled to remove the pipe connection at any time without disturbing the valve-seat. The main feature of my invention, however, may be attained without resorting to this construction. For instance, the sleeve B may be confined by a nut H' and have an extension B', in which the end of the pipe K is seated and to which it is secured by a nut J', as shown in Fig. 2, or the flange or collar $m$ of the pipe K may be seated in the outer end of the sleeve B, so that a single nut H² may serve to confine both, as shown, for instance, in Fig. 3.

Having thus described my invention, I claim and desire to secure by Letters Patent—

1. The combination, in a check-valve, of the valve-casing having inlet and outlet branches at an angle to each other, the sleeve forming the valve-seat adapted to the inlet branch of the casing and capable of being turned therein, the valve hung to the inner end of the sleeve at one side of the same, the supply-pipe, and means for securing said pipe and sleeve to the inlet branch of the casing, substantially as specified.

2. The combination, in a check-valve, of the valve-casing having inlet and outlet branches at an angle to each other, the sleeve forming the valve-seat adapted to the inlet branch of the casing and capable of being turned therein, the valve hung to the inner end of the sleeve at one side of the same, the supply-pipe, and means for independently securing the sleeve and supply-pipe, substantially as specified.

3. The combination, in a check-valve, of the valve-casing having inlet and outlet branches at an angle to each other, a sleeve forming the valve-seat adapted to the inlet branch of the casing and capable of being turned therein, a valve hung to the inner end of the sleeve at one side of the same, a nut whereby said sleeve is confined to the inlet branch of the casing, a supply-pipe, and means for confining the same to said sleeve-retaining nut, whereby the connections of pipe and sleeve are independent of each other, substantially as specified.

4. The combination, in a check-valve, of the valve-casing and its seat, the pivoted arm constituting the valve-carrier, the valve-disk swiveled on said arm, and a projecting lug on the valve-disk which serves by contact with said arm as a stop to prevent rotation of the valve-disk, substantially as specified.

In testimony whereof I have signed my name to this specification in the presence of two subscribing witnesses.

JOHN R. GOEHRING.

Witnesses:
EUGENE ELTERICH,
HARRY SMITH.